(12) United States Patent
Liu

(10) Patent No.: US 10,813,079 B2
(45) Date of Patent: Oct. 20, 2020

(54) PAGING SIGNAL TRANSMITTING METHOD, PAGING SIGNAL RECEIVING METHOD, DEVICE AND SYSTEM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/476,167

(22) PCT Filed: Feb. 14, 2017

(86) PCT No.: PCT/CN2017/073510
§ 371 (c)(1),
(2) Date: Jul. 5, 2019

(87) PCT Pub. No.: WO2018/126512
PCT Pub. Date: Jul. 12, 2018

(65) Prior Publication Data
US 2019/0357170 A1    Nov. 21, 2019

(30) Foreign Application Priority Data

Jan. 6, 2017 (WO) ............... PCT/CN2017/070474

(51) Int. Cl.
*H04W 68/02* (2009.01)
*H04W 48/08* (2009.01)
(Continued)

(52) U.S. Cl.
CPC ........... *H04W 68/02* (2013.01); *H04W 48/08* (2013.01); *H04W 52/0216* (2013.01);
(Continued)

(58) Field of Classification Search
CPC ... H04W 68/025; H04W 8/005; H04W 76/28; H04W 72/0453; H04W 52/0216;
(Continued)

(56) References Cited

FOREIGN PATENT DOCUMENTS

| CN | 1353892 A | 6/2002 |
|----|-----------|--------|
| CN | 105027524 A | 11/2015 |

(Continued)

OTHER PUBLICATIONS

International Search Report and Written Opinion of PCT Application No. PCT/CN2017/073510, dated Sep. 30, 2017, issued by the ISA/CN—State Intellectual Property Office of the P.R. China.
(Continued)

*Primary Examiner* — Sam Bhattacharya
(74) *Attorney, Agent, or Firm* — Finnegan, Henderson, Farabow, Garrett & Dunner, L.L.P.

(57) ABSTRACT

The present disclosure discloses a paging signal transmitting method, a paging signal receiving method, a device and a system, and relates to the field of communication. The paging signal transmitting method includes: generating a paging signal by an access network device, and transmitting the paging signal to a terminal by the access network device simultaneously using n scanning beams on n sub-bands, wherein the scanning beams that correspond to the respective sub-bands have different beam scanning areas, and n is a positive integer greater than 1. In examples of the present disclosure, n scanning beams are used by the access network device to simultaneously perform the scanning, which reduces the beam scanning period required for completely scanning the cell to be 1/n of the corresponding beam scanning period of the single scanning beam. In this way, the wake-up duration configured to the terminal is reduced, and (Continued)

the time when the terminal is in the dormant state is further increased, which is thereby beneficial to the terminal to save power.

18 Claims, 8 Drawing Sheets

(51) Int. Cl.
    *H04W 52/02*     (2009.01)
    *H04W 56/00*     (2009.01)
    *H04W 68/00*     (2009.01)
    *H04W 72/04*     (2009.01)

(52) U.S. Cl.
    CPC ....... *H04W 56/001* (2013.01); *H04W 68/005* (2013.01); *H04W 72/0446* (2013.01); *H04W 72/0453* (2013.01)

(58) Field of Classification Search
    CPC ........... H04W 56/001; H04W 72/0446; H04W 68/02; H04W 72/04
    See application file for complete search history.

(56) References Cited

FOREIGN PATENT DOCUMENTS

| | | |
|---|---|---|
| CN | 105379357 A | 3/2016 |
| CN | 105812035 A | 7/2016 |
| CN | 106170930 A | 11/2016 |
| WO | WO 2011/097406 A1 | 8/2011 |

OTHER PUBLICATIONS

Second office action of Chinese application no. 201780000041.2 dated Mar. 5, 2020.

PAGING SIGNAL TRANSMITTING METHOD, PAGING SIGNAL RECEIVING METHOD, DEVICE AND SYSTEM

CROSS REFERENCE TO RELATED APPLICATIONS

This application is a national phase application of International Application PCT/CN2017/073510, filed on Feb. 14, 2017, which claims priority to International Application PCT/CN2017/070474, filed on Jan. 6, 2017, the contents of all of which are incorporated herein by reference.

TECHNICAL FIELD

The present disclosure relates to the field of mobile communication technologies, and in particular, to a method and device for transmitting and receiving paging signals.

BACKGROUND

In a long-term evolution (LTE) system, a base station transmits, by omni-directional transmission technologies, a paging indication to a terminal within a cell periodically, so that the terminal in sleeping state acquires a corresponding paging message from the base station after receiving the paging indication in a discontinuous reception (DRX) cycle.

In the 5th generation mobile communication (5G) system, the base station and the terminal may a high frequency band of 6 GHz or higher, and in order to solve the problem that the high-frequency signal coverage is poor and the attenuation is large, the base station may transmit a signal to the terminal by means of beam scanning. For example, when a base station transmits a paging signal to a terminal in a cell by means of beam scanning, the base station completes scanning of the entire cell by changing the beam direction of the scanning beams. The duration required by the base station for one complete scanning of the cell is one beam scanning period. The terminal may be wakened up every other DRX cycle. To ensure that the terminal can receive the scanning beams in time, the terminal shall be configured with a wake-up duration longer than or equal to one beam scanning period, which causes the terminal to have a rather long wake-up duration, and thereby is not beneficial to the terminal to save power.

SUMMARY

Since the terminal shall be configured with a wake-up duration longer than or equal to one beam scanning period, the terminal may have a rather long wake-up duration, which thereby is not beneficial to the terminal to save power. In order to solve this problem, embodiments of the present disclosure provide methods and devices for transmitting and receiving paging signals.

In a first aspect, there is provided a method for transmitting a paging signal, comprising: generating, by an access network device, a paging signal; and transmitting, by the access network device, the paging signal to a terminal simultaneously by n scanning beams on n sub-bands, wherein the scanning beams that correspond to the respective sub-bands have different beam scanning areas, and n is a positive integer greater than 1.

Optional, wherein a collection of the beam scanning areas of the n scanning beams is a coverage of a cell of the access network device.

Optional, wherein the n is determined by the number of transmission reception points (TRPs); and/or, the n is determined by the number of terminals located in a coverage of a cell of the access network device.

Optional, wherein the paging signal occupies a first time-frequency resource on the sub-bands; or, the paging signal occupies the first time-frequency resource and a second time-frequency resource on the sub-bands.

Optional, wherein configuring the paging signal corresponding to a first terminal and/or, a second terminal to be carried by the first time-frequency resource; and configuring the paging signal corresponding to second terminal to be carried by the second time-frequency resource; wherein the first terminal is a terminal that does not support a preset frequency band; the second terminal is a terminal that supports the preset frequency band; and a frequency band of the second time-frequency resource belongs to the preset frequency band.

Optional, wherein the paging signal includes a paging indication and a paging message; the paging indication and paging message of the first terminal and the paging indication of the second terminal are carried by the first time-frequency resource, and the paging message of the second terminal is carried by the second time-frequency resource; or, the paging indication and paging message of the first terminal are carried by the first time-frequency resource, and the paging indication and paging message of the second terminal are carried by the second time-frequency resource.

Optional, wherein the method further comprises: transmitting, by the access network device, a resource position of the first time-frequency resource to the first terminal and the second terminal via minimum system information (minimum SI); and transmitting, by the access network device, a resource position of the second time-frequency resource by the access network device to the second terminal via other system information (other SI).

Optional, wherein each of the sub-bands comprises m synchronization signal blocks located in m consecutive time domain units, and a synchronization signal is carried by the synchronization signal blocks, the m being a positive integer greater than 1; the paging signal is carried by a time-frequency resource that is located after a time domain position of the synchronization signal in each of the synchronization signal blocks; or, the paging signal is carried by each of the synchronization signal blocks, the paging signal having the same time domain position as the synchronization signal; or, the paging signal is carried by m time-frequency resources that are located after the time domain position of the m synchronization signal blocks; wherein a frequency band of the first time-frequency resource belongs to the frequency band of the synchronization signal blocks, and the frequency band of the second time-frequency resource does not belong to the frequency band of the synchronization signal blocks.

Optional, wherein when the paging signal is carried by m time-frequency resources that are located after the time domain position of the m synchronization signal blocks, the transmitting, by the access network device, the paging signal to the terminal simultaneously by n scanning beams on n sub-bands comprises: transmitting, by the access network device and after transmitting the synchronization signal and the broadcast signal that are carried by the m SS Blocks simultaneously by n first scanning beams on the n sub-bands, the paging signal carried by the m time-frequency resources to the terminal simultaneously by n second scanning beams on the n sub-bands.

Optional, wherein the paging signal includes a paging indication and a paging message; each of the sub-bands includes m synchronization signal blocks located in m consecutive time domain units, and a synchronization signal is carried by the synchronization signal blocks, the m being a positive integer greater than 1; and the paging indication is carried by a time-frequency resource that is located after the time domain position of the synchronization signal in each of the synchronization signal blocks, and the paging message is carried by m time-frequency resources that are located after the time domain position of the m synchronization signal blocks.

Optional, wherein the method further comprises: transmitting, by the access network device, system information to the terminal, wherein the system information carries a paging occasion (PO) that corresponds to the paging signal, and the PO is determined by a length of the time-frequency resource, occupied by the paging signal, in time domain.

In a second aspect, there is provided a method for receiving a paging signal, comprising:

receiving, by a terminal, a paging signal transmitted by an access network device, wherein the paging signal is transmitted by the access network device simultaneously by n scanning beams on n sub-bands, and the scanning beams that correspond to the respective sub-bands have different beam scanning areas, n being a positive integer greater than 1.

Optional, wherein a collection of the beam scanning areas of the n scanning beams is a coverage of a cell of the access network device.

Optional, wherein the n is determined by the number of transmission reception points (TRPs); and/or, the n is determined by the number of terminals located in a coverage of a cell of the access network device.

Optional, wherein the paging signal occupies a first time-frequency resource on the sub-bands; or, the paging signal occupies the first time-frequency resource and a second time-frequency resource on the sub-bands.

Optional, wherein receiving by the terminal the paging signal transmitted by the access network device comprises: receiving, by the terminal, the paging signal on the first time-frequency resource when the terminal is a first terminal; and receiving, by the terminal, the paging signal in the first time-frequency resource and/or the second time-frequency resource when the terminal is a second terminal; wherein the first terminal is a terminal that does not support a preset frequency band; the second terminal is a terminal that supports the preset frequency band; and a frequency band of the second time-frequency resource belongs to the preset frequency band.

Optional, wherein the paging signal comprises a paging indication and a paging message;

the paging indication and paging message of the first terminal and the paging indication of the second terminal are carried by the first time-frequency resource, and the paging message of the second terminal is carried by the second time-frequency resource; or, the paging indication and paging message of the first terminal are carried by the first time-frequency resource, and the paging indication and paging message of the second terminal are carried by the second time-frequency resource.

Optional, wherein the method further comprises:

receiving, by the terminal, a resource position of the first time-frequency resource that is transmitted by the access network device via minimum system information (minimum SI), when the terminal is the first terminal; and receiving, by the terminal, the resource position of the first time-frequency resource that is transmitted by the access network device via the minimum SI and a resource position of the second time-frequency resource that is transmitted by the access network device via other system information (other SI), if the terminal is the second terminal.

Optional, wherein each of the sub-bands comprises m synchronization signal blocks located in m consecutive time domain units, and a synchronization signal is carried by the synchronization signal blocks, the m being a positive integer greater than 1; the paging signal is carried by a time-frequency resource that is located after a time domain position of the synchronization signal in each of the synchronization signal blocks; or, the paging signal is carried by each of the synchronization signal blocks, the paging signal having the same time domain position as the synchronization signal; or, the paging signal is carried by m time-frequency resources that are located after the time domain position of the m synchronization signal blocks; wherein a frequency band of the first time-frequency resource belongs to the frequency band of the synchronization signal blocks, and the frequency band of the second time-frequency resource does not belong to the frequency band of the synchronization signal blocks.

Optional, wherein when the paging signal is carried by m time-frequency resources that are located after the time domain position of the m synchronization signal blocks, the receiving, by the terminal, the paging signal transmitted by the access network device comprises: receiving, by the terminal and after receiving a synchronization signal and a broadcast signal that are carried by the m synchronization signal blocks and transmitted by the access network device, the paging signal that is carried by the m time-frequency resources and transmitted by the access network device; wherein the synchronization signal and the broadcast signal that are carried by the m synchronization signal blocks are transmitted simultaneously by n first scanning beams on the n sub-bands, and the paging signal carried by the m time-frequency resources is transmitted simultaneously by n second scanning beams on the n sub-bands.

Optional, wherein the paging signal comprises the paging indication and the paging message; each of the sub-bands comprises m synchronization signal blocks located in m consecutive time domain units, and a synchronization signal is carried by the synchronization signal blocks, the m being a positive integer greater than 1; and the paging indication is carried by the time-frequency resource that is located after the time domain position of the synchronization signal in each of the synchronization signal blocks, and the paging message is carried by m time-frequency resources that are located after the time domain position of the m synchronization signal blocks.

Optional, wherein the terminal is an ultra-reliable and low latency communication (uRLLC) terminal; and receiving by the terminal the paging signal transmitted by the access network device comprises: detecting whether the paging indication corresponding to the terminal is carried by the synchronization signal blocks; determining a paging occasion (PO) that corresponds to the paging signal as a first time domain length if the paging information corresponding to the terminal is carried by the synchronization signal blocks, the first time domain length being a sum of time domain lengths corresponding to the m synchronization signal blocks and m time-frequency resources; and acquiring the paging message carried by the m time-frequency resources.

Optional, wherein the method further comprises: receiving by the terminal system information transmitted by the access network device, wherein the system information carries the PO that corresponds to the paging signal, and the PO is determined by a time domain length of the time-frequency resource occupied by the paging signal; and receiving by the terminal the paging signal transmitted by the access network device comprises: receiving by the terminal the paging signal according to the PO.

In a third aspect, there is provided a device for transmitting a paging signal, comprising:

a generating unit, configured to generate a paging signal; and a transmitting unit, configured to transmit the paging signal to a terminal simultaneously by n scanning beams on n sub-bands, wherein the scanning beams that correspond to the respective sub-bands have different beam scanning areas, and n is a positive integer greater than 1.

Optional, wherein a collection of the beam scanning areas of the n scanning beams is a range of a coverage of a cell of the access network device.

Optional, wherein the n is determined by the number of transmission reception points (TRPs); and/or the n is determined by the number of terminals located in a coverage of a cell of the access network device.

Optional, wherein the paging signal occupies a first time-frequency resource on the sub-bands; or, the paging signal occupies the first time-frequency resource and a second time-frequency resource on the sub-band.

Optional, wherein the first time-frequency resource is configured to carry the paging signal corresponding to a first terminal and/or a second terminal; and the second time-frequency resource is configured to carry the paging signal corresponding to the second terminal; wherein the first terminal is a terminal that does not support a preset frequency band; the second terminal is a terminal that supports the preset frequency band; and a frequency band of the second time-frequency resource belongs to the preset frequency band.

Optional, wherein the paging signal comprises a paging indication and a paging message; the paging indication and paging message of the first terminal and the paging indication of the second terminal are carried by the first time-frequency resource, and the paging message of the second terminal is carried by the second time-frequency resource; or, the paging indication and paging message of the first terminal are carried by the first time-frequency resource, and the paging indication and paging message of the second terminal are carried by the second time-frequency resource.

Optional, wherein the transmitting unit is further configured to transmit resource position of the first time-frequency resource to the first terminal and the second terminal via minimum system information, and transmit resource position of the second time-frequency resource to the second terminal via other system information.

Optional, wherein each of the sub-bands comprises m synchronization signal blocks located in m consecutive time domain units, and a synchronization signal is carried by the synchronization signal blocks, the m being a positive integer greater than 1; the paging signal is carried by a time-frequency resource that is located after the time domain position of the synchronization signal in each of the synchronization signal blocks; or, the paging signal is carried by each of the synchronization signal blocks, the paging signal having the same time domain position as the synchronization signal; or, the paging signal is carried by m time-frequency resources that are located behind the time domain position of the m synchronization signal blocks, wherein a frequency band of the first time-frequency resource belongs to the frequency band of the synchronization signal blocks, and the frequency band of the second time-frequency resource does not belong to the frequency band of the synchronization signal blocks.

Optional, wherein when the paging signal is carried by m time-frequency resources that are located after the time domain position of the m synchronization signal blocks, the transmitting unit is further configured to transmit the paging signal carried by the m synchronization signal blocks to the terminal simultaneously using n second scanning beams on the n sub-bands after transmitting the synchronization signal and the broadcast signal that are carried by the m synchronization signal blocks simultaneously using n first scanning beams on the n sub-bands.

Optional, wherein the paging signal comprises the paging indication and the paging message; each of the sub-bands comprises m synchronization signal blocks located in m consecutive time domain units, and the synchronization signal is carried by the synchronization signal blocks, the m being a positive integer greater than 1; and the paging indication is carried by the time-frequency resource that is located after the time domain position of the synchronization signal in each of the synchronization signal blocks, and the paging message is carried by m time-frequency resources that are located after the time domain position of the m synchronization signal blocks.

Optional, wherein the transmitting unit is further configured to transmit system information to the terminal, wherein the system information carries a paging occasion (PO) that corresponds to the paging signal, and the PO is determined by a time domain length of the time-frequency resource occupied by the paging signal.

In a fourth aspect, there is provided a device for receiving a paging signal, comprising:

a receiving unit, configured to receive a paging signal transmitted by an access network device, wherein the paging signal is transmitted by the access network device simultaneously using n scanning beams on n sub-bands, and the scanning beams that correspond to the respective sub-bands have different beam scanning areas, n being a positive integer greater than 1.

Optional, wherein a collection of the beam scanning areas of the n scanning beams is a range of a coverage of a cell of the access network device.

Optional, wherein the n is determined by the number of transmission reception points (TRPs); and/or the n is determined by the number of terminals located in the a coverage of a cell of the access network device.

Optional, wherein the paging signal occupies a first time-frequency resource on the sub-bands; or, the paging signal occupies the first time-frequency resource and a second time-frequency resource on the sub-bands.

Optional, wherein the receiving unit is further configured to receive the paging signal on the first time-frequency resource if the terminal is a first terminal; and the receiving unit is further configured to receive the paging signal on the first time-frequency resource and/or the second time-frequency resource if the terminal is a second terminal; wherein the first terminal is a terminal that does not support a preset frequency band; the second terminal is a terminal that supports the preset frequency band; and a frequency band of the second time-frequency resource belongs to the preset frequency band.

Optional, wherein the paging signal comprises a paging indication and a paging message; the paging indication and paging message of the first terminal and the paging indication of the second terminal are carried by the first time-frequency resource, and the paging message of the second terminal is carried by the second time-frequency resource; or, the paging indication and paging message of the first terminal are carried by the first time-frequency resource, and the paging indication and paging message of the second terminal are carried by the second time-frequency resource.

Optional, wherein the receiving unit is further configured to receive a resource position of the first time-frequency resource transmitted by the access network device via minimum system information, if the terminal is the first terminal; and the receiving unit is further configured to receive a resource position of the first time-frequency resource transmitted by the access network device via minimum system information, and a resource position of the second time-frequency resource transmitted by the access network device via other system information, if the terminal is the second terminal.

Optional, wherein each of the sub-bands comprises m synchronization signal blocks located in m consecutive time domain units, and the synchronization signal is carried by the synchronization signal blocks, the m being a positive integer greater than 1; the paging signal is carried by the time-frequency resource that is located after the time domain position of the synchronization signal in each of the synchronization signal blocks; or, the paging signal is carried by each of the synchronization signal blocks, the paging signal having the same time domain position as the synchronization signal; or, the paging signal is carried by m time-frequency resources that are located after the time domain position of the m synchronization signal blocks, wherein a frequency band of the first time-frequency resource belongs to the frequency band of the synchronization signal blocks, and the frequency band of the second time-frequency resource does not belong to the frequency band of the synchronization signal blocks.

Optional, wherein when the paging signal is carried by m time-frequency resources that are located after the time domain position of the m synchronization signal blocks, the receiving unit is configured to receive the paging signal that is carried by the m time-frequency resources and transmitted by the access network device after receiving the synchronization signal and the broadcast signal that are carried by the m synchronization signal blocks and transmitted by the access network device; wherein the synchronization signal and the broadcast signal that are carried by the m synchronization signal blocks are transmitted simultaneously using n first scanning beams on the n sub-bands, and the paging signal carried by the m time-frequency resources is simultaneously transmitted using n second scanning beams on the n sub-bands.

Optional, wherein the paging signal comprises the paging indication and the paging message; each of the sub-bands comprises m synchronization signal blocks located in m consecutive time domain units, and the synchronization signal is carried by the synchronization signal blocks, the m being a positive integer greater than 1; and the paging indication is carried by the time-frequency resource that is located after the time domain position of the synchronization signal in each of the synchronization signal blocks, and the paging message is carried by m time-frequency resources that are located after the time domain position of the m synchronization signal blocks.

Optional, wherein the terminal is an ultra-reliable and low latency communication (uRLLC) terminal; and the receiving unit is further configured to: detect whether the paging indication corresponding to the terminal is carried by the synchronization signal blocks; determine a paging occasion (PO) that corresponds to the paging signal as a first time domain length if the paging indication corresponding to the terminal is carried by the synchronization signal blocks, the first time domain length being a sum of time domain lengths corresponding to the m synchronization signal blocks and m time-frequency resources; and acquiring the paging message carried by the m time-frequency resources.

Optional, wherein the receiving unit is further configured to receive system information transmitted by the access network device, wherein the system information carries the PO that corresponds to the paging signal, and the PO is determined by a time domain length of the time-frequency resource occupied by the paging signal; and the receiving unit is further configured to receive the paging signal according to the PO.

In a fifth aspect, there is provided an access network device, comprising:
a processor; a transceiver connected to the processor; and a memory for storing a processor-executable instruction, wherein the processor is configured to: generate a paging signal; and
transmit the paging signal to a terminal simultaneously using n scanning beams on n sub-bands, wherein the scanning beams that correspond to the respective sub-bands have different beam scanning areas, and n is a positive integer greater than 1.

In a sixth aspect, there is provided a terminal comprising:
a processor; a transceiver connected to the processor; and a memory for storing a processor-executable instruction, wherein
the processor is configured to: receive a paging signal transmitted by an access network device, wherein the paging signal is transmitted by the access network device simultaneously using n scanning beams on n sub-bands, and the scanning beams that correspond to the respective sub-bands have different beam scanning areas, n being a positive integer greater than 1.

Advantageous effects of the technical solutions according to embodiments of the present disclosure are as follows.

After the access network device generates the paging signal, the paging signal is transmitted to the terminal simultaneously using n scanning beams having different beam scanning areas on n sub-bands, which thereby reduces the transmission latency of the paging signal. Meanwhile, compared to using a single scanning beam to completely scan the cell, in embodiments of the present disclosure, n scanning beams are used by the access network device to simultaneously perform the scanning, which reduces the beam scanning period required for completely scanning the cell to be 1/n of the corresponding beam scanning period of the single scanning beam. In this way, the wake-up duration configured to the terminal is reduced, and the time when the terminal is in the sleeping mode is further increased, which is thereby beneficial to the terminal to save power.

BRIEF DESCRIPTION OF THE DRAWINGS

To describe the technical solutions in the examples of the present disclosure more clearly, the following briefly introduces the accompanying drawings required for describing the examples. Apparently, the accompanying drawings in the following description show merely some examples of the present disclosure, and a person of ordinary skill in the art may still derive other drawings from these accompanying drawings without creative efforts.

DETAILED DESCRIPTION

The present disclosure will be described in further detail with reference to the accompanying drawings, to present the objects, technical solutions, and advantages of the present disclosure clearer.

"Module" as mentioned in the present disclosure generally refers to a program or instruction that is stored in a memory and capable of performing certain functions; and "unit" as mentioned in the present disclosure generally refers to a functional structure that is logically divided, wherein the "unit" may be implemented by a pure hardware or a combination of hardware and software.

"A plurality of" mentioned in the present disclosure means two or more in number. "And/or" describes the association relationship between the associated objects and indicates that there may be three relationships; for example, A and/or B may indicate three cases where only A exists, A and B exist at the same time, and only B exists. The character "/" generally indicates that the relationship between the former and later associated objects is optional.

Since the terminal shall be configured with a wake-up duration longer than or equal to one beam scanning period, the terminal may have a rather long wake-up duration, which thereby is not beneficial to the terminal to save power. In order to solve this problem, examples of the present disclosure provide method and device for transmitting and receiving paging signals. The technical solutions are as follows.

Figure 1:
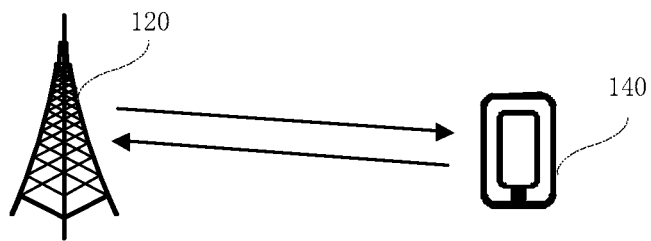
FIG. 1 is a schematic structural diagram of a mobile communication system according to an example.

Referring to FIG. 1 that is a schematic structural diagram of a mobile communication system according to an example, the mobile communication system may be a 5G system, also known as a new radio (NR) system. The mobile communication system includes an access network device 120 and a terminal 140.

The access network device 120 may be a base station. For example, the base station may be a base station adopting a centrally-distributed architecture in the 5G system, such as a gNB. When adopting a centrally-distributed architecture, the access network device 120 generally includes a central unit (CU) and at least two distributed units (DUs). The CU is provided with a protocol stack of a packet data convergence protocol (PDCP) layer, a radio link control (RLC) layer, and a media access control (MAC) layer; and the DUs are provided with a physical (PHY) layer protocol stack. The specific implementation manner of the access network device 120 is not limited in examples of the present disclosure. The access network device 120 further includes a transceiver that is a multiple-input multiple-output (MIMO) antenna supporting the beamforming. Optionally, the transceiver is a beam scanning node, such as transmission reception point (TRP) or the like.

The access network device 120 is wirelessly connected to the terminal 140 through a radio air interface. Optionally, the radio air interface is a radio air interface based on the fifth generation mobile communication network technology (5G) standard, such as a new radio (NR); or the radio air interface is a radio air interface based on a next generation mobile communication network technology standard after the 5G.

The terminal 140 may be a device that provides voice and/or data connectivity to a user. The terminal may communicate with one or more core networks via a radio access network (RAN). The terminal 140 may be a mobile terminal, such as a mobile phone (or a "cell" phone) or a computer with a mobile terminal. For example, the terminal may be a portable, pocket, handheld, computer built-in or in-vehicle mobile device, such as, a subscriber unit, a subscriber station, a mobile station, a mobile, a remote station, an access point, a remote terminal, an access terminal, a user terminal, a user agent, a user device, or a user equipment.

It should be noted that a plurality of access network devices 120 and/or a plurality of terminals 140 may be included in the mobile communication system shown in FIG. 1. FIG. 1 illustrates an example includes only one access network device 120 and one terminal 140, and it is not a limit for the examples.

In the 5G system, the access network device and the terminal will adopt a high frequency band of 6 GHz or higher. However, in the high frequency band, the attenuation of the high frequency signal is large, thereby causing a small coverage of the high frequency signal. In order to solve the problem that the high-frequency signal coverage is small and the attenuation is large, in the 5G system, the access network device may transmit the high-frequency signal to the terminal located in the managed cell by beam scanning.

In related arts, in order to implement the beam scanning, a beam scanning node, such as a transmission reception point (TRP) or the like, is provided by the access network device to the managed cell. Then, the beam scanning node is configured to transmit the scanning beams, thereby completing the beam scanning of the entire cell by changing the beam direction of the scanning beam. For example, as shown in FIG. 2(a), when the access network device 220 transmits a paging signal to the terminal 240 in the cell by beam scanning, the entire cell can be completely scanned by performing the scanning a circle in a clockwise direction (by continually changing the beam direction of the scanning beams 221), the position shown in the figure being taken as a starting point of the scanning. As shown in FIG. 2(b), in the time domain (t)-frequency (f) coordinate axis, the time-frequency unit corresponding to each block indicates scanning beams including the paging signal, and the scanning beams that correspond to each block have a different beam direction. Thus, the beam scanning period required by the access network device to scan for one complete circle is 16 time domain units.

When the terminal 240 is waken up within the DRX cycle and receives its own paging signal, and then responds the paging signal immediately to complete the entire paging process. However, if the terminal 240 is waken up within the DRX cycle and the scanning beams 221 just sweep through the terminal 240 already, the terminal 240 shall remain at an awake state until the next scanning cycle to receive the paging signal in time. The terminal 240 needs to remain at the awake state for a long time within each DRX cycle (the wake-up duration is greater than or equal to one beam scanning period, namely, greater than or equal to 16 time domain units), which is not beneficial for the terminal to save power.

Figure 3A:
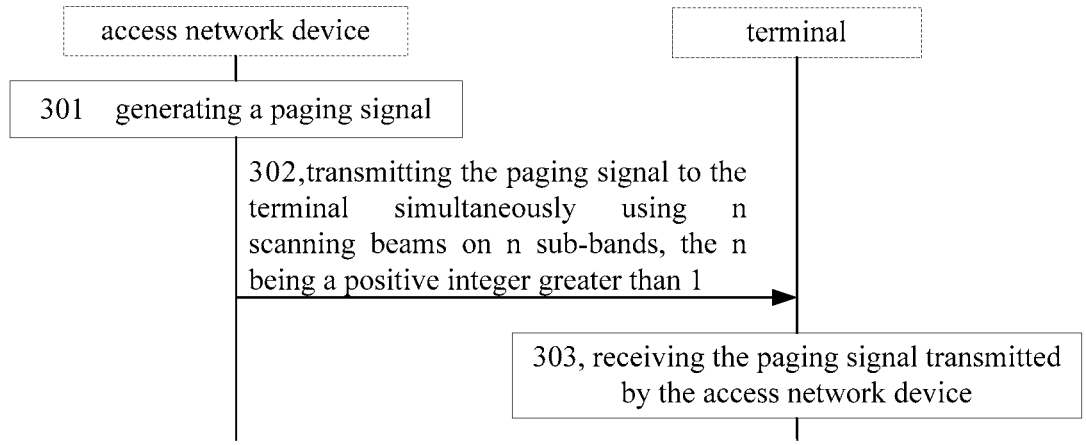
FIG. 3A is a flow chart of a method for transmitting a paging signal according to an example.

Referring to FIG. 3A that is a flow chart of a method for transmitting a paging signal according to an example, this example is exemplified by applying the method for transmitting a paging signal to the mobile communication system shown in FIG. 1. The method includes following steps.

In step 301, a paging signal is generated by an access network device.

Optionally, the paging signal includes a paging indication and/or a paging message. The paging indication is configured to indicate whether the terminal is paged, and the paging message includes information such as calling device identifier, paging time, and the like.

Optionally, the paging signal generated by the access network device is carried in a synchronization signal block (SS Block) or after the SS Block, so that the terminal further responds, after completing the synchronization according to the synchronization signal in the SS Block, to the paging according to the paging signal.

In step 302, the access network device transmits the paging signal to the terminal simultaneously by n scanning beams on n sub-bands, where n is a positive integer greater than one.

The terminal herein is a generic term and used to indicate at least one terminal.

After the access network device generates the paging signal, the paging signal may be extended to the n sub-bands and transmitted simultaneously to the terminal in the covered cell by scanning beams on each sub-band. Optionally, the n sub-bands are n consecutive sub-bands.

Optionally, beam scanning areas of the respective scanning beams corresponding to each sub-band are different, and the collection of the beam scanning areas of the respective scanning beams is the coverage of the cell of the access network device. Illustratively, the beam scanning area of the scanning beam corresponding to each sub-band occupies 1/n of the coverage of the access network device.

Figure 3B:
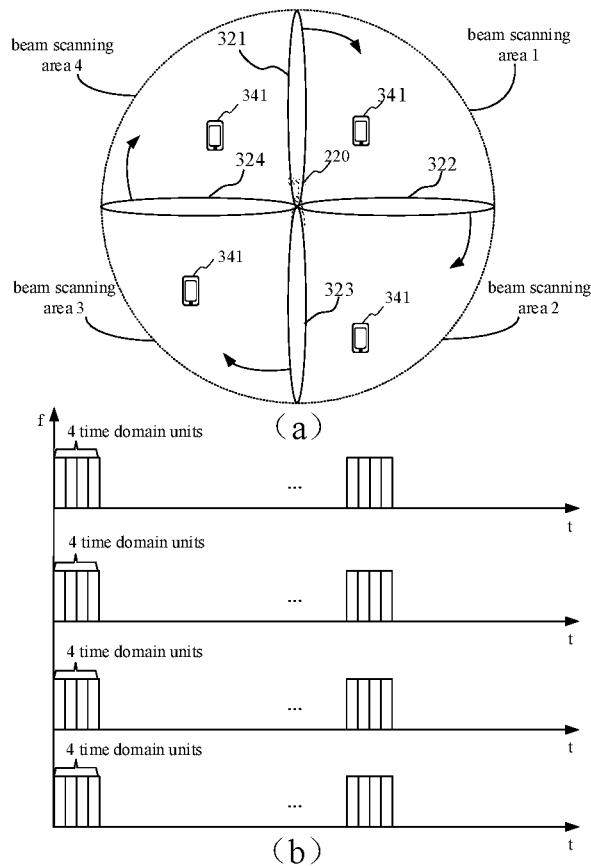
FIG. 3B is a schematic diagram of implementation of the method for transmitting a paging signal shown in FIG. 3A.

For example, as shown in FIG. 3B (a), the paging signal is extended to four sub-bands, and the scanning beams that correspond to the respective sub-bands are a first scanning beam 321, a second scanning beam 322, a third scanning beam 323, and a fourth scanning beam 324, respectively. The first scanning beam 321 corresponds to the beam scanning area 1 (the 90° sector area at the upper right corner); the second scanning beam 322 corresponds to the beam scanning area 2 (the 90° sector area at the lower right corner); the third scanning beam 323 corresponds to the beam scanning area 3 (the 90° sector area at the lower left corner); and the fourth scanning beam 324 corresponds to the beam scanning area 4 (the 90° sector area at the upper left corner). That is, the beam scanning area of each scanning beam occupies ¼ of the complete beam scanning area.

The coverage of a single scanning beam is limited. Thus, the access network device needs to continuously change the scanning direction of the scanning beams on respective sub-bands, so as to achieve complete coverage of respective beam scanning areas. That is, for one same beam scanning area, different scanning beams may be adopted by the access network device in different time domain units to scan the current beam scanning area. But only one scanning beam is adopted to one same time domain unit to scan the current beam scanning area.

Optionally, the scanning beams on respective sub-bands have one same scanning direction. For example, as shown in FIG. 3B(a), the scanning direction of each scanning beam is clockwise.

In a example, when the scanning directions of the scanning beams are all clockwise, the scanning end position of the $i^{th}$ scanning beam among n scanning beams coincides with the boundary of the sector beam scanning area corresponding to the $(i+1)^{th}$ scanning beam, where i<n; and the scanning end position of the $i^{th}$ scanning beam coincides with the boundary of the sector beam scanning area corresponding to the first scanning beam, where i=n.

Figure 2:
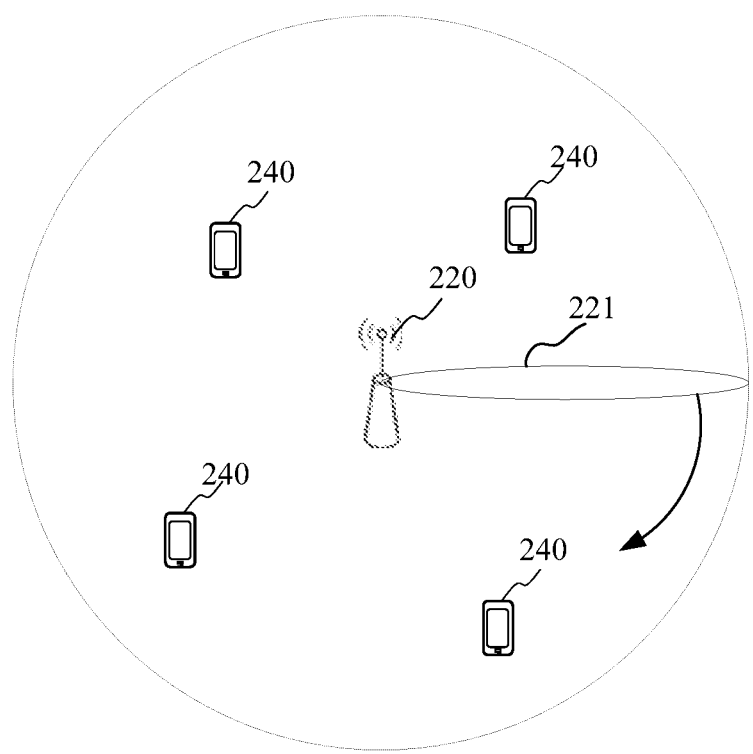
FIG. 2 is a schematic diagram illustrating that an access network device performs beam scanning to a cell.
Figure 2:
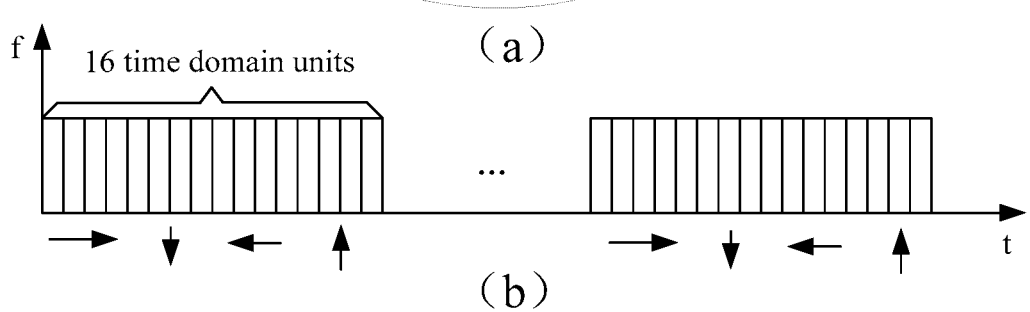

Since n scanning beams are simultaneously adopted by n sub-bands for beam scanning, the beam scanning period can be greatly reduced compared with the beam scanning manner adopted by the access network device in FIG. 2. Illustratively, as shown in FIG. 3B(b), four scanning beams are simultaneously adopted by the access network device on four sub-bands for beam scanning. When each sub-band requires four time domain units to perform the complete scanning of the respective beam scanning areas, the access network device may need four time domain units in total to implement the complete beam scanning of the covered cell. Thus, the beam scanning period is reduced to ¼ of the 16 time domain units that is required by the access network device, as shown in FIG. 2(b), to perform the complete beam scanning on the covered cell.

It should be noted that the time domain units required by the sub-bands to perform the complete scanning on the beam scanning area is related to the coverage of the beam scanning area. The larger the coverage of the beam scanning area is, the more the time domain units required by the sub-bands to perform the complete scanning on the beam scanning area; and the smaller the range of the beam scanning area is, the less the time domain units required by the sub-bands to perform the complete scanning on the beam scanning area. This example is presented by taking an example that only four time domain units are required to perform the complete scanning on the beam scanning area, which does not limit the present disclosure.

When the paging signal is transmitted to the terminal in the cell in the above manner, the paging latency of the terminal may be reduced since the beam scanning period is reduced to 1/n. Correspondingly, the wake-up duration configured to the terminal is also reduced to 1/n of the original duration. That is, the terminal can remain in a sleeping state for a longer time, which is beneficial to the terminal to save power.

In step 303, the terminal receives the paging signal transmitted by the access network device.

Correspondingly, when the terminal located in the coverage of the cell of the access network device is waken up within the DRX cycle and the scanning beams scan to the terminal, the terminal may receive the corresponding paging signal. The paging signal is transmitted by the access network device simultaneously by n scanning beams on n sub-bands, and the respective scanning beams that correspond to each sub-band have a different beam scanning area, where n is a positive integer greater than 1.

Illustratively, as shown in FIG. 3B(a), when the terminal 341 located in the beam scanning area 1 is waken up within the DRX cycle, and the terminal receives the corresponding paging signal when the first scanning beam 321 scans the terminal.

Optionally, after receiving the paging signal, the terminal determines whether a paging corresponding to the terminal is included in the paging indication of the paging signal. When a paging is included, the terminal acquires a corresponding paging message from the paging signal and responds to the paging; when the paging is not included, the terminal abandons the paging signal and enters the sleeping state.

To sum up, in the method for transmitting a paging signal according to examples of the present disclosure, after the access network device generates the paging signal, the paging signal is transmitted to the terminal simultaneously by n scanning beams having different beam scanning areas on n sub-bands, which thereby reduces the transmission latency of the paging signal. Meanwhile, the beam scanning period required by the access network device to completely scan the coverage of the cell is reduced, which reduces the wake-up duration configured to the terminal and further increases the time when the terminal is in the sleeping state, thereby being beneficial to the terminal to save power.

It should be noted that the aforesaid steps 301 and 302 can separately implement the examples of the method for transmitting a paging signal on the access network device side, and the aforesaid step 303 can separately implement the examples of the method for receiving a paging signal on the terminal side. This is not limited in the examples.

In the aforesaid examples, the illustration is presented by an example that four scanning beams are simultaneously adopted by the access network device on four sub-bands to transmit the paging signal to the terminal. Optionally, the number n of sub-bands and scanning beams adopted by the access network device to transmit the paging signal is determined by the number of TRPs, and/or determined by the number of terminals located in coverage of the cell of the access network device. Wherein, the maximum value of n does not exceed the total number of TRPs.

In an example, the number of sub-bands and scanning beams adopted by the access network device to transmit the paging signal is proportional to the number of TRPs. That is, the more TRPs are provided by the access network device, the more sub-bands and scanning beams are applied to transmit the paging signal. Correspondingly, the beam scanning area corresponding to each scanning beam may become smaller, and the beam scanning period required by the access network device to completely scan the coverage of the cell may also become smaller.

Optionally, when four TRPs are adopted by the access network device, the access network device may transmit the paging signal to the terminal on four sub-bands by four scanning beams, and the beam scanning area corresponding to each scanning beam is a 90° sector area. When three TRPs are provided in the access network device, the access network device may transmit the paging signal to the terminal on three sub-bands by three scanning beams, and the beam scanning area corresponding to each scanning beam is a 120° sector area.

In another example, the access network device determines the number of sub-bands and scanning beams according to the number of terminals in the coverage of the cell. Optionally, when the number of terminals in the coverage of the cell is less than a preset number, a part of TRPs are adopted by the access network device to transmit the paging signal on the corresponding sub-bands, thereby reducing the power while ensuring the paging quality, when the number of terminals in the coverage of the cell is greater than the preset number, all TRPs are adopted by the access network device to transmit the paging signal on the corresponding sub-bands, thereby reducing the paging latency and improving the paging quality.

Optionally, the number of sub-bands and scanning beams adopted by the access network is determined according to the latency requirement of the terminal in the cell. For example, when the latency requirement of the terminal in the cell is lower than a preset latency requirement (that is, the terminal is a low-latency demand terminal), a part of TRPs are adopted by the access network device to transmit the paging signal on the corresponding sub-bands, thereby reducing the power consumption while ensuring the paging quality. When the latency requirement of the terminal in the cell is higher than the preset latency requirement (that is, the terminal is a high-latency demand terminal), all TRPs are adopted by the access network device to transmit the paging signal on the corresponding sub-bands, thereby reducing the paging latency and improving the paging quality.

In an example, each sub-band includes m SS Blocks located in m consecutive time domain units, each of the SS Blocks carries a synchronization signal, and the paging signal generated by the access network device is carried by the SS Block.

Figure 4A:
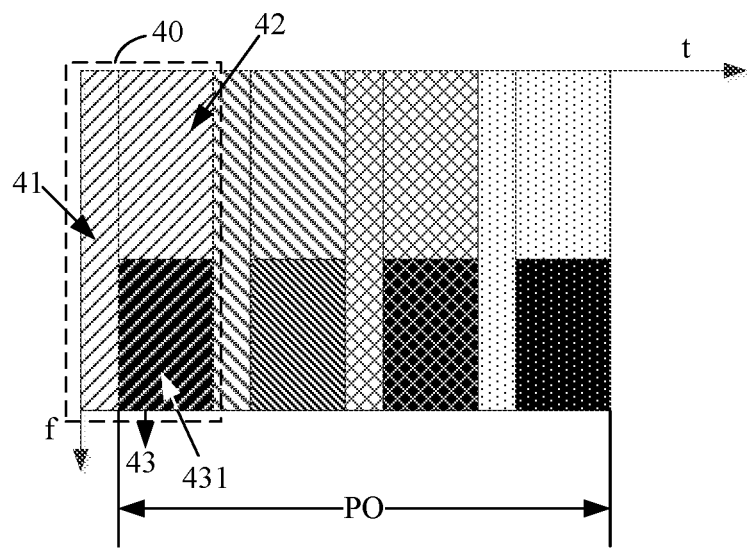
FIG. 4A is a schematic diagram of a paging signal carrying mode according to an example.

Illustratively, for any one of the four sub-bands shown in FIG. 3B(b), as shown in FIG. 4A, the sub-band includes four SS Blocks 40 located in four consecutive time domain units, and each of the SS Blocks 40 includes a synchronization signal 41, a broadcast signal 42, and a paging signal 43.

A first time-frequency resource 431 occupied by the paging signal 43 is located in a time domain position after the time domain position of the synchronization signal 41 in the SS Blocks 40, so that when the terminal receives the SS Blocks 40, synchronization is firstly performed based on the synchronization signal 41 in the SS Blocks 40, and then a paging response is performed based on the paging signal 43.

Figure 4B:
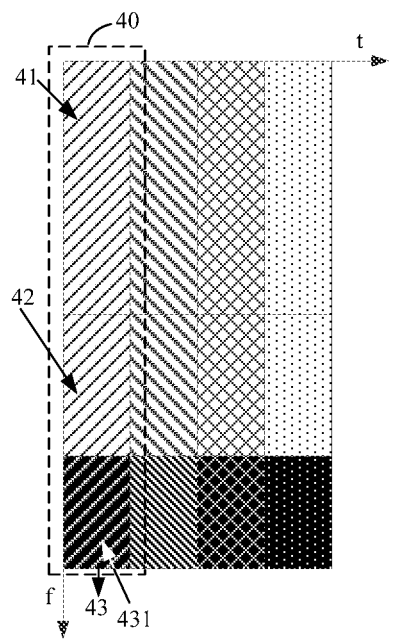
FIG. 4B is a schematic diagram of a paging signal carrying mode according to another example.

In another example, as shown in FIG. 4B, the paging signal 43 is located in each SS Block 40, and the time domain position of the paging signal 43 is same with the time domain position of the synchronization signal 41 and the broadcast signal 42. That is, the synchronization signal 41, the broadcast signal 42 and the paging signal 43 are located in different frequency domain positions correspond to a same time domain position.

As shown in FIG. 4A, the frequency band of the first time-frequency resource occupied by the paging signal 43 belongs to the frequency band of the SS Blocks 40. For a first terminal that does not support the preset frequency band (that is, a narrow bandwidth terminal), when the first time-frequency resource carries the paging signal corresponding to the first terminal, the first terminal is capable of receiving a corresponding paging signal in the first time-frequency resource, because the frequency band supported by the first terminal and the frequency band of the SS Blocks are the same. For a second terminal that supports the preset frequency band (that is, a broadband terminal), when the paging signal corresponding to the second terminal is carried by the first time-frequency resources, the second terminal is also capable of receiving a corresponding paging signal in the first time-frequency resource, because the frequency band supported by the second terminal is greater than the frequency band of the SS Blocks. Wherein, the preset frequency band is set according to communication standards.

As can be seen, the access network device may adopt a manner, all the paging signal is carried by the first time-frequency resource of the frequency band to which the SS Blocks belong, as shown in FIG. 4A, so that both the narrow bandwidth terminal and the broadband terminal can acquire the paging signal from the SS Blocks and thereby improves the reliability in paging transmission and reception.

However, if the paging signals of all the terminals (including the first terminal and the second terminal) are carried by the first time-frequency resource, the time domain resource occupied by the SS Blocks may increase with the increasing of content of the paging signal. In the case of a large paging throughput, the beam scanning period of the access network device may be increased, causing an increase in the latency of the paging signal. Correspondingly, the terminal needs to remain at the awake state for a longer time to receive the paging signal.

Figure 4C:
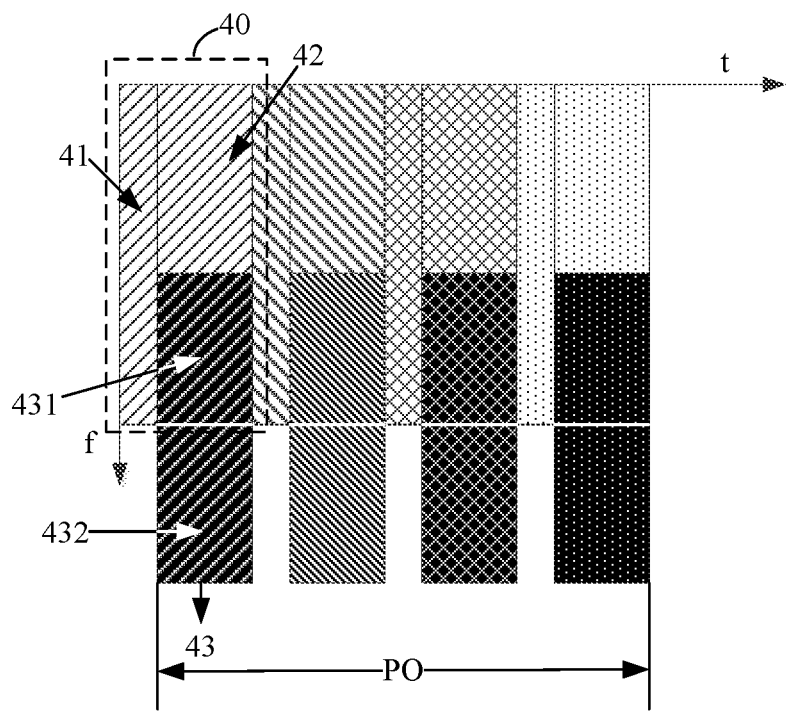
FIG. 4C is a schematic diagram of a paging signal carrying mode according to yet another example.

In order to solve the aforesaid problem, in an example as shown in FIG. 4C, the paging signal 43 occupies the first time-frequency resource 431 and the second time-frequency resource 432 on the sub-bands. The frequency band of the first time-frequency resource 431 is smaller than or greater than the frequency band of the second time-frequency resource 432, and the first time-frequency resource 431 and the second time-frequency resource 432 are consecutive. The frequency band of the first time-frequency resource 431 belongs to the frequency band of the SS Blocks 40, while the frequency band of the second time-frequency resource 432 does not belong to the frequency band of the SS Blocks 40 but belongs to a preset frequency band supported by the second terminal. In another example, the first time-frequency resource 431 and the second time-frequency resource 432 are not consecutive. That is, as shown in FIG. 4C, the second time-frequency resource 432 is located above the frequency domain of the broadcast signal 42, which is not limited in examples of the present disclosure.

In order to ensure that the first terminal can receive the paging signal on a frequency band supported by the first terminal, the first time-frequency resource 431 is configured to carry the paging signal corresponding to the first terminal and/or the second terminal, and the second time-frequency resource 432 is configured to only carry the paging signal corresponding to the second terminal.

Optionally, the access network device transmits, by minimum system information (minimum SI), a resource position of the first time-frequency resource to the first terminal and the second terminal. Correspondingly, the first terminal and the second terminal receive the minimum SI, thereby acquiring the paging signal carried by the first time-frequency resource according to the resource position carried in the minimum SI. At the same time, in order to enable the second terminal supporting the broadband to acquire the paging signal carried by the second time-frequency resource, the access network device transmits the resource position of the second time-frequency resource to the second terminal by other system information (other SI). Correspondingly, the second terminal receives the other SI and acquires the resource position of the second time-frequency resource carried in the other SI.

Optionally, when the paging signal of the first and second terminals is simultaneously included, the access network device configures the paging signal corresponding to the first terminal to be carried by the first time-frequency resource 431 preferentially; and when there is a vacancy in the resource 431, the access network device configures a part of the paging signal corresponding to the second terminal to be carried by the first time-frequency resource 431, and configures the remaining part of the paging signal corresponding to the second terminal to be carried by the second time-frequency resource 432.

Correspondingly, the first terminal acquires the paging signal from the first time-frequency resource on the sub-bands, and the second terminal acquires the paging signal from the first time-frequency resource and/or the second time-frequency resource on the sub-bands.

Figure 4D:
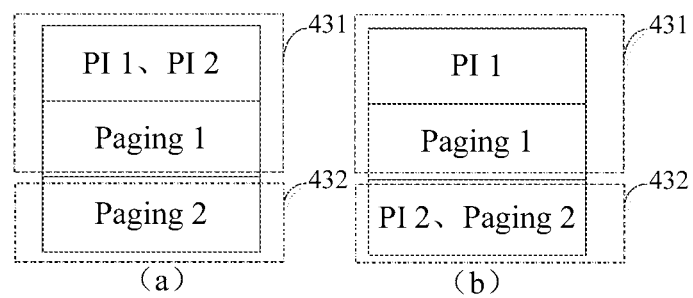
FIG. 4D is a schematic diagram of a carrying mode for a paging indication and a paging message in the paging signal.

In an example, as shown in FIG. 4D(a), when the paging indication and the paging message are included in the paging signal, the access network device may allocate the paging indication PI 1 and the paging message Paging 1 of the first terminal to be carried by the first time-frequency resource 431, and allocate the paging indication PI 2 and the paging message Paging 2 of the second terminal to be carried by the second time-frequency resource 432.

In another example, the time-frequency resource occupied by the paging indication is much smaller than the time-frequency resource occupied by the paging message. Thus, as shown in FIG. 4D(b), the paging indication PI 1 and the paging message Paging 1 of the first terminal and the paging indication PI 2 of the second terminal are allocated to be carried by the first time-frequency resource 431 by the access network device, and the paging message Paging 2 of the second terminal are allocated to be carried by the second time-frequency resource 432.

Obviously, when the manner, that paging signal are carried by the two time-frequency resources, is adopted by the access network device as shown in FIG. 4B, the frequency domain of the time-frequency resource carrying the paging signal is increased, and the time domain of the time-frequency resource carrying the paging signal is reduced. Compared with the manner of paging signal carrying mode shown in FIG. 4A, when the paging throughout is large, the beam scanning period of the access network device is smaller, and the latency of the paging signal is smaller; thus, accordingly, the terminal only needs to maintain at the awake state for a short time to receive the paging signal, which is beneficial to the terminal to save power.

In paging signal carrying modes shown in FIGS. 4A-4C, the time-frequency resources (including the first time-frequency resource and/or the second time-frequency resource) carrying the paging signal are all located inside the SS Blocks. That is, the paging signal and the SS Blocks are transmitted simultaneously. When the paging in the system is sparse, if the access network device allocates the paging signal to be carried by each transmitted SS Block, it means a waste of the time-frequency resource.

In another example, to avoid the waste of the time-frequency resource, the paging signal is carried by m time-frequency resources located after the time domain position of m SS Blocks. In addition, m SS Blocks in every i group(s) correspond to m time-frequency resources of one group, where i is a positive integer greater than 0. Illustratively, as shown in FIG. 4E, the first time-frequency resource 431 and the second time-frequency resource 432 that carry the paging signal 43 are carried by the time domain positions of the four SS Blocks 40.

The first time-frequency resource 431 is configured to carry the paging signal corresponding to the first terminal and/or the second terminal, and the second time-frequency resource 432 is configured to only carry the paging signal corresponding to the second terminal. The specific carrying mode is similar to the carrying mode shown in FIG. 4C, and details will not be described herein again.

Figure 4E:
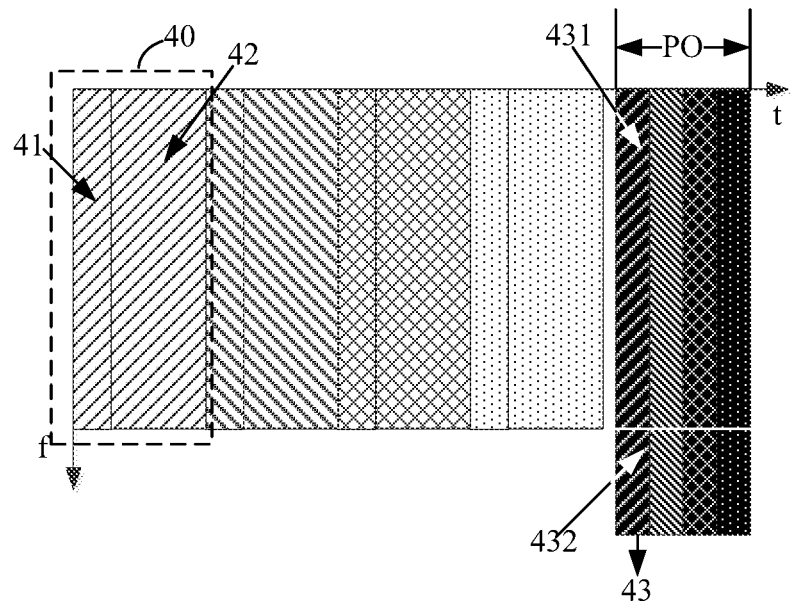
FIG. 4E is a schematic diagram of a paging signal carrying mode according to yet another example.
Figure 4F:
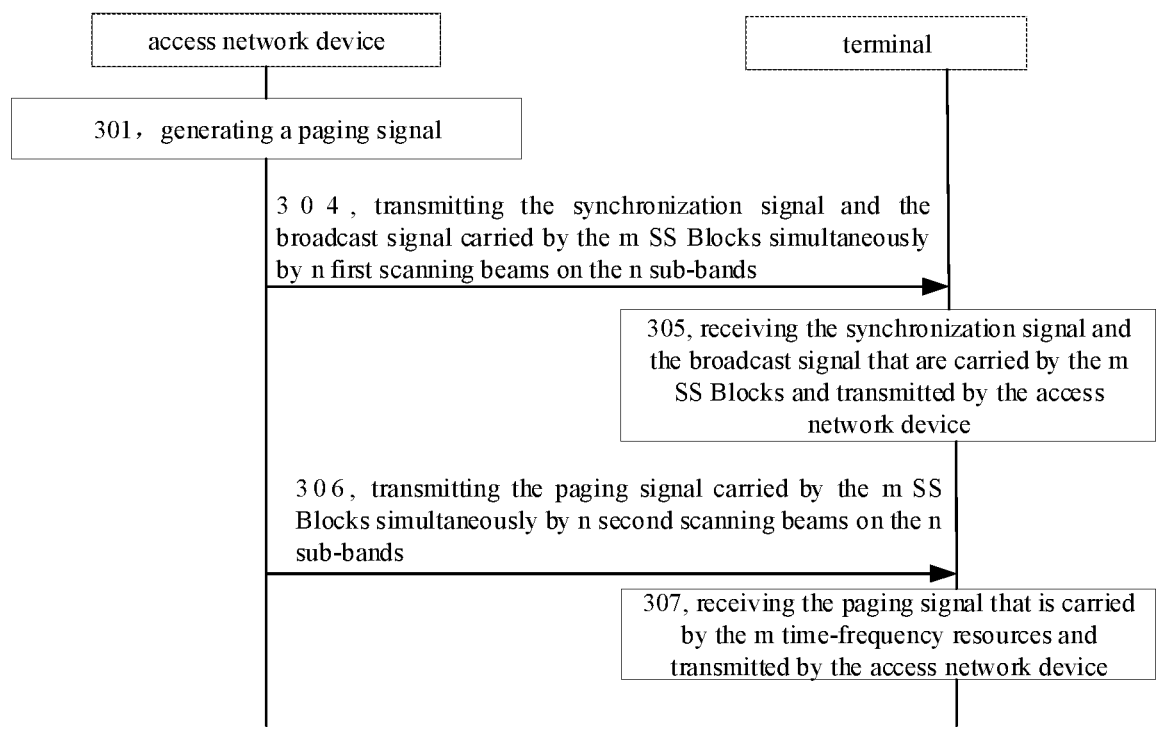
FIG. 4F is a flow chart of a method for transmitting a paging signal according to another example.

Optionally, when the paging signal carrying mode shown in FIG. 4E is adopted, the access network device may transmit the SS Blocks and the paging signal by different scanning beams. In an example, based on FIG. 3A, the aforesaid steps 302 and 303 may be replaced by following steps as shown in FIG. 4F.

In step 304, the access network device transmits the synchronization signal and the broadcast signal carried by the m SS Blocks simultaneously by n first scanning beams on the n sub-bands.

Regarding respective sub-bands in the n sub-bands, the access network device transmits to the terminal the synchronization signal and the broadcast signal carried by the m SS Blocks by the first scanning beam on the sub-bands.

In step 305, the terminal receives the synchronization signal and the broadcast signal that are carried by the m SS Blocks and transmitted by the access network device.

Correspondingly, the terminal receives on the sub-bands the synchronization signal and the broadcast signal that are carried by the m SS Blocks and transmitted by the access network device, and then performs synchronization according to the synchronization signal.

In step 306, the access network device transmits the paging signal carried by the m SS Blocks simultaneously by n second scanning beams on the n sub-bands.

In an example, when the paging in the system is frequent, the access network device may immediately initiate n second scanning beams to transmit to the terminal the paging signal carried by the time-frequency resources after transmitting the synchronization signal and the broadcast signal (carried by the SS Blocks) by the first scanning beam. That is, a group of paging signals are transmitted by the access network device after each group of SS Blocks are transmitted by the access network device.

When the paging in the system is sparse, the access network device may initiate second scanning beams on the n sub-bands to transmit to the terminal the paging signal carried by the m time-frequency resources after transmitting i group(s) of the SS Blocks to the terminal by the first scanning beam. That is, a group of paging signals are transmitted by the access network device after i group of SS Blocks are transmitted by the access network device, so as to avoid the waste of time-frequency resources caused by frequently transmitting the paging signals when the paging is sparse.

In step 307, the terminal receives the paging signal that is carried by the m time-frequency resources and transmitted by the access network device.

The paging signal carried by the m time-frequency resources is transmitted by the access network device simultaneously by n second scanning beams on the n sub-bands. Correspondingly, after receiving the time-frequency resources, the terminal may immediately respond to the paging according to the paging signal carried by the time-frequency resources.

Obviously, after the access network device configures the paging signal to be carried by the time domain positions of the SS Blocks in the manner shown in FIG. 4E, the access network device transmits the paging signal separately by the scanning beams, so as to avoid the waste of time-frequency resources caused by that the access network device configures the paging signal to be carried by the each transmitted SS Blocks. Meanwhile, compared with the carrying modes shown in FIG. 4A to FIG. 4C, the length of the time domain occupied by the time-frequency resources carrying the paging signal is smaller, and the wake-up duration configured to the terminal is also correspondingly reduced, which thereby further improves the power saving performance of the terminal.

In another example, regarding the low-latency terminals, such as uRLLC terminal or the like, in the communication system, each sub-band may include m SS Blocks located in m consecutive time domain units, so as to ensure that such a low-latency terminal can respond to the paging signal as soon as possible. In addition, the paging indication in the paging signal is carried by the time-frequency resource of each SS Block located at a position after the time domain position of the synchronization signal, and the paging message in the paging signal is carried by m time-frequency resources located after the time domain position of the m SS Blocks.

Figure 4G:
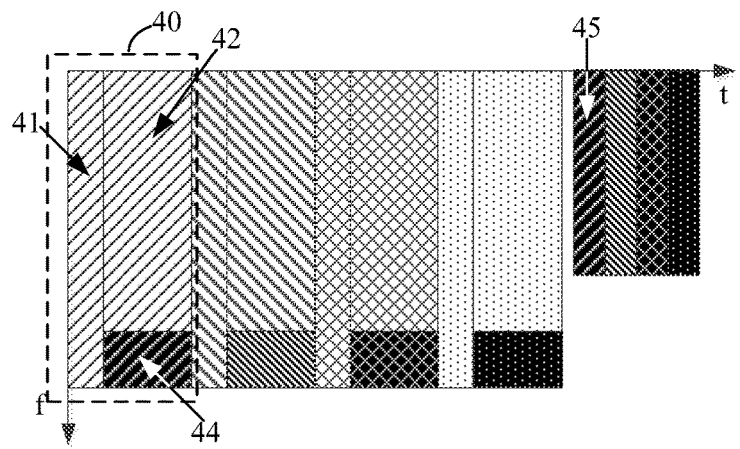
FIG. 4G is a schematic diagram of a paging signal carrying mode according to yet another example.

Illustratively, as shown in FIG. 4G, each of the sub-bands includes four SS Blocks 40 located in four consecutive time domain units, and each of the SS Blocks 40 has the synchronization signal 41 and the broadcast signal 42 borne therein. When transmitting the paging signal, the access network device configures the paging indication 44 in the paging signal to be carried by the time-frequency resource at a time domain position after the time domain position of the synchronization signal 41, and configures the paging message 45 in the paging signal to be carried by the four time-frequency resources located after the time domain position of the four SS Blocks 40.

Figure 4H:
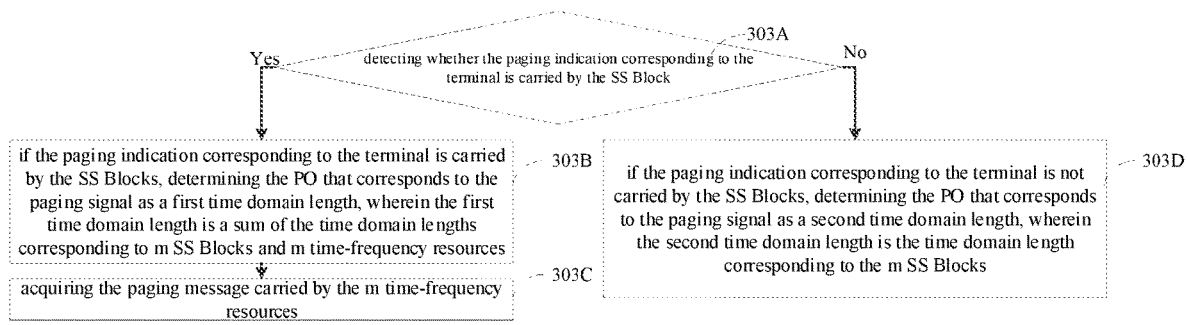
FIG. 4H is a flow chart of a method for receiving a paging signal by a terminal.

Correspondingly, when the uRLLC terminal receives the synchronization signal shown in FIG. 4G, the aforesaid step 303 may include following steps as shown in FIG. 4H.

In step 303A, the terminal detects whether the paging indication corresponding to the terminal is carried by the SS Block.

Regarding the uRLLC terminal in the communication system, after receiving the SS Blocks transmitted by the access network device on the sub-bands, then the terminal may analyze the SS Block to further detect whether a paging indication corresponding to the terminal is included or not. If the paging indication is included, following steps 303B and 303C are performed to further acquire the corresponding paging message. If the paging indication is not included, following step 303D is performed.

In step 303B, if the paging indication corresponding to the terminal is carried by the SS Blocks, the terminal determines the PO that corresponds to the paging signal as a first time domain length, wherein the first time domain length is a sum of the time domain lengths corresponding to m SS Blocks and m time-frequency resources.

When the terminal detects that the paging indication corresponding to the terminal is carried by the SS Blocks, the terminal knows that a paging message will be transmitted subsequently. In order to ensure the paging message can be received in time, the terminal needs to remain at the awake state after receiving the SS Blocks. Therefore, the terminal determines the PO that corresponds to the paging signal as the first time domain length. That is, the terminal remains at the awake state during the first time domain length to ensure that the paging message carried by m time-frequency resources can be acquired in time after the m SS Blocks.

Illustratively, as shown in FIG. 4G, when the terminal detects that its own paging indication is carried by the SS Blocks, then the terminal determines the PO as the sum of the time domain lengths corresponding to the four SS Blocks 40 and the four time-frequency resources after the SS Blocks 40.

In step 303C, the terminal acquires the paging message carried by the m time-frequency resources.

Furthermore, the terminal remains at the awake state under the PO and acquires the paging message carried by the m time-frequency resources after the SS Blocks, so as to complete the paging according to its own paging message.

In step 303D, if the paging indication corresponding to the terminal is not carried by the SS Blocks, the terminal determines the PO that corresponds to the paging signal as a second time domain length, wherein the second time domain length is the time domain length corresponding to the m SS Blocks.

When the terminal detects that the paging indication is not carried by the SS Blocks, the terminal knows that the paging message will not be transmitted subsequently, and thus determines the PO that corresponds to the paging signal as a time domain length (that is, the second time domain length) corresponding to the m SS Blocks, so that the terminal enters to the sleeping state after receiving the m SS Blocks, thereby acquiring the power saving effect.

Optionally, the access network device configures m time-frequency resources (carrying the paging message) after the time domain position of the SS Blocks only for the low-latency terminal in the communication system. For the high-latency terminal in the communication system, the access network terminal configures the paging indication corresponding to the high-latency terminal to be carried only by the SS Blocks. Correspondingly, the high-latency terminal acquires the corresponding paging message from the access network device by beam requesting after acquiring the paging indication by analyzing the SS Blocks, so as to complete the paging response. It's not a limit for the examples of the present disclosure.

Figure 4I:
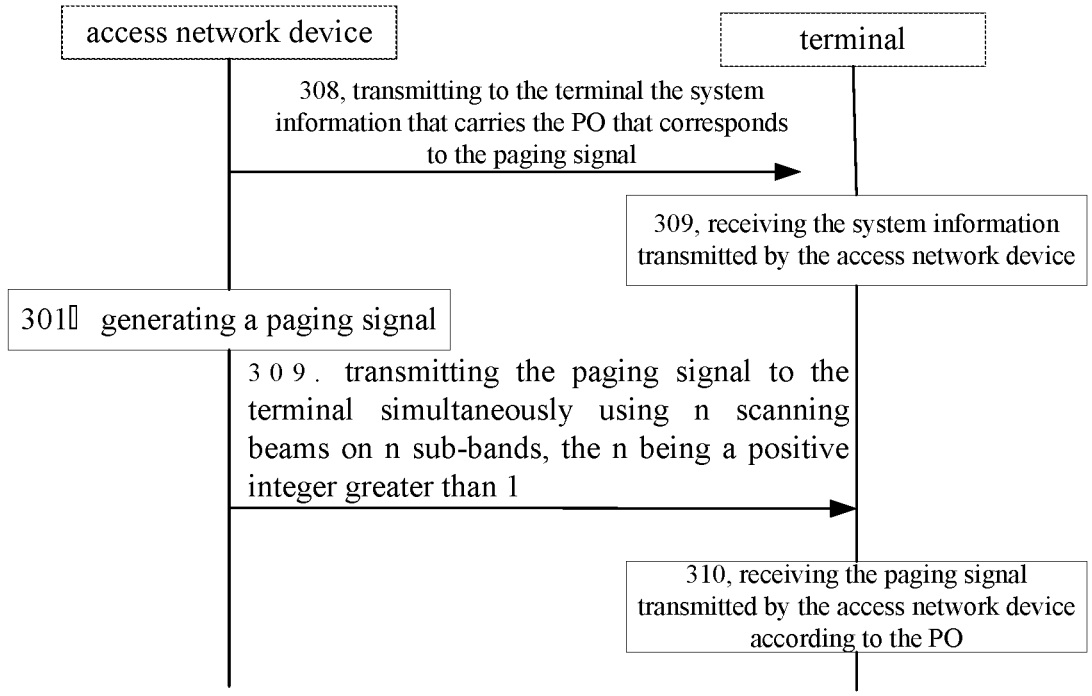
FIG. 4I is a flow chart of a method for transmitting a paging signal according to yet another example.

In order to enable the terminal to know the time for receiving the paging signal, basing on FIG. 3A, steps 308 and 309 are included before the aforesaid step 301, and the step 303 is replaced by step 309 as shown in FIG. 4I.

In step 308, the access network device transmits to the terminal the system information that carries the PO that corresponds to the paging signal, wherein the PO is determined by the time domain length occupied by the paging signal.

After entering to coverage of the cell of the access network device, the terminal may receive the system information transmitted by the access network device, wherein the system information includes the PO that corresponds to the paging signal.

Illustratively, as shown in FIGS. 4A-4C, the PO that corresponds to the paging signal is namely the time domain length of the time-frequency resource occupied by the first to fourth time-frequency resources configured to carry the paging signal.

In step 309, the terminal receives the system information transmitted by the access network device.

Optionally, after receiving the system information transmitted by the access network device, the terminal acquires the PO included in the system information and then configures a reception window (that is, the wake-up duration) according to the length of the PO, wherein the reception window is longer than the PO.

In step 301, the access network device generates the paging signal.

In step 302, the access network device transmits the paging signal to the terminal simultaneously by n scanning beams on n sub-bands, where n is a positive integer greater than one.

In step 310, the terminal receives the paging signal transmitted by the access network device according to the PO.

Optionally, the terminal receives the paging signal transmitted by the access network device according to the configured reception window. That is, the terminal remains at the awake state during the reception window and receives the paging signal transmitted by the access network device by beam scanning.

It should be noted that, in the aforesaid examples, the steps of taking the access network device as the execution subject may separately achieve implementation of examples regarding the method for transmitting a paging signal on the access network device side, and the steps of taking the terminal as the execution subject may separately achieve implementation of the examples regarding the method for receiving the paging signal on the terminal side. In addition, a person skilled in the art may implement the aforesaid examples by combination according to actual needs, which is not limited in this example.

The followings are examples of devices of the present disclosure, which may be used to implement the examples of methods of the present disclosure. For details not disclosed in the examples of devices of the present disclosure, please refer to the examples of methods of the present disclosure.

Figure 5:
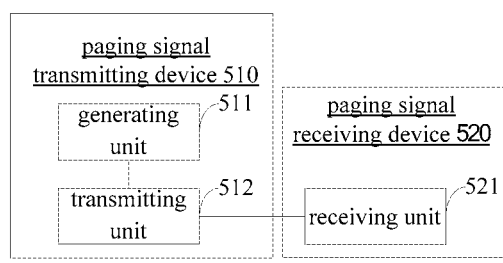
FIG. 5 is a schematic structural diagram of a paging system according to an example of the present disclosure.

Referring to FIG. 5 that is a schematic structural diagram of a paging system according to an example of the present disclosure, the paging system includes a paging signal transmitting device 510 and a paging signal receiving device 520. The paging signal transmitting device 510 may be implemented as all or a part of the access network device by software, hardware, and a combination thereof, and the paging signal receiving device 520 may be implemented as all or a part of the terminal by software, hardware, and a combination thereof.

The paging signal transmitting device 510 may include a generating unit 511 and a transmitting unit 512.

The generating unit 511 is configured to implement functions of the aforesaid step 301 and functions related to the generating step.

The transmitting unit 512 is configured to implement functions of the aforesaid step 302, 304, 306 or 308 and functions related to the transmitting step.

The paging signal receiving device 520 may includes a receiving unit 521.

The receiving unit 521 is configured to implement functions of the aforesaid step 303 (including steps 303A-303D), 305, 307, 309 or 310 and functions related to the receiving step.

For related details, please refer to the examples shown in FIGS. 3A, 3B, and 4A to 4I.

Figure 6:
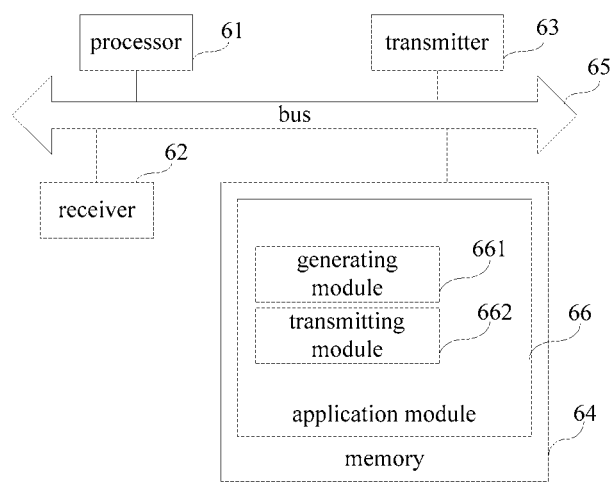
FIG. 6 is a schematic structural diagram of an access network device according to an example of the present disclosure.

Referring to FIG. 6 that is a schematic structural diagram of an access network device according to an example of the present disclosure, the access network device includes a processor 61, a receiver 62, a transmitter 63, a memory 64 and a bus 65.

The professor 61 includes one or more processing cores, and executes a plurality of functional applications and information processing by running software programs and modules.

The receiver 62 and the transmitter 63 may be implemented as a communication component that may be a communication chip. The communication chip may include a receiving module, a transmitting module, a modem module and the like to modulate and/or demodulate the information and receive or transmit the information via wireless signals.

The memory 64 is connected to the processor 61 via the bus 65.

The memory 64 may be configured to store the software programs and modules.

The memory 64 may store an application module 66 performing the at least one function. The application module 66 may include a generating module 661 and a transmitting module 662.

The processor 61 is configured to execute the generating module 661 to implement the functions related to the generating step in the aforesaid examples of methods; and the processor 61 is also configured to execute the transmitting module 662 to implement the functions related to the transmitting step in the aforesaid method examples.

Furthermore, the memory 64 may be implemented by any type of volatile or non-volatile storage device, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or a CD.

Figure 7:
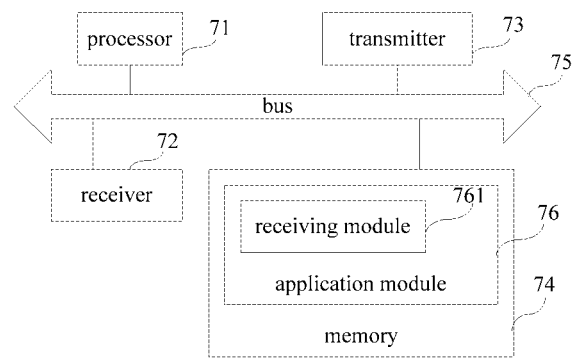
FIG. 7 is a schematic structural diagram of a terminal according to an example of the present disclosure.

Referring to FIG. 7 that is a schematic structural diagram of a terminal according to an example of the present disclosure, the terminal includes a processor 71, a receiver 72, a transmitter 73, a memory 74 and a bus 75.

The professor 71 includes one or more processing cores, and executes a plurality of functional applications and information processing by running software programs and modules.

The receiver 72 and the transmitter 73 may be implemented as a communication component that may be a communication chip. The communication chip may include a receiving module, a transmitting module, a modem module and the like to modulate and demodulate the information and receive or transmit the information via wireless signals.

The memory 74 is connected to the processor 71 via the bus 75.

The memory 74 may be configured to store the software programs and modules.

The memory 74 may store an application module 76 performing the at least one function. The application module 76 may include a receiving module 761.

The processor 71 is configured to execute the receiving module 761 to implement the functions related to the receiving step in the aforesaid examples of methods.

Furthermore, the memory 74 may be implemented by any type of volatile or non-volatile storage device, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or a CD.

A person skilled in the art shall appreciate that in one or more examples described above, the functions described in the examples of the present disclosure may be implemented in hardware, software, firmware, or any combination thereof. If the functions are implemented in the software, they may be stored in a computer readable medium or transmitted as one or more instructions or codes on a computer readable medium. The computer readable medium includes a computer storage medium and a communication medium, wherein the communication medium includes any medium that facilitates transfer of a computer program from one place to another, and the storage medium may be any available medium that can be accessed by a general-purpose or special-purpose computer.

The foregoing descriptions are merely preferred examples of the present disclosure, and are not intended to limit the present disclosure. Within the spirit and principles of the disclosure, any modifications, equivalent substitutions, improvements, etc., are within the protection scope of the present disclosure.

What is claimed is:

1. A method for transmitting a paging signal, comprising:
generating, by an access network device, a paging signal; and
transmitting, by the access network device, the paging signal to a terminal simultaneously by n scanning beams on n sub-bands, wherein then scanning beams that correspond to the n sub-bands, respectively, have different beam scanning areas, n being a positive integer greater than 1, and a collection of the beam scanning areas of the n scanning beams is a coverage of a cell of the access network device.

2. An access network device, comprising:
a processor;
a transceiver connected to the processor; and
a memory for storing a processor-executable instruction, wherein
the processor is configured to:
generate a paging signal; and
transmit the paging signal to a terminal simultaneously using n scanning beams on n sub-bands, wherein the n scanning beams that correspond to the n sub-bands, respectively, have different beam scanning areas, n being a positive integer greater than 1, and a collection of the beam scanning areas of the n scanning beams is a coverage of a cell of the access network device.

3. The access network device according to claim 2, wherein the n is determined by a number of transmission reception points (TRPs); and/or the n is determined by a number of terminals located in the coverage of the cell of the access network device.

4. The access network device according to claim 2, wherein
the paging signal occupies a first time-frequency resource on the sub-bands;
or
the paging signal occupies the first time-frequency resource and a second time-frequency resource on the sub-bands.

5. The access network device according to claim 4, wherein each of the sub-bands comprises m synchronization signal blocks located in m consecutive time domain units, and a synchronization signal is carried by the synchronization signal blocks, the m being a positive integer greater than 1;
the paging signal is carried by a time-frequency resource that is located after a time domain position of the synchronization signal in each of the synchronization signal blocks;
or
the paging signal is carried by each of the synchronization signal blocks, the paging signal having the same time domain position as the synchronization signal;
or
the paging signal is carried by m time-frequency resources that are located after the time domain position of the m synchronization signal blocks; wherein a frequency band of the first time-frequency resource belongs to the frequency band of the synchronization signal blocks, and the frequency band of the second time-frequency resource does not belong to the frequency band of the synchronization signal blocks.

6. The access network device according to claim 5, wherein when the paging signal is carried by m time-frequency resources that are located after the time domain position of the m synchronization signal blocks,
transmitting the paging signal to the terminal simultaneously by n scanning beams on n sub-bands comprises:
transmitting, after transmitting the synchronization signal and a broadcast signal that are carried by the m synchronization signal blocks simultaneously by n first scanning beams on the n sub-bands, the paging signal carried by the m time-frequency resources to the terminal simultaneously by n second scanning beams on the n sub-bands.

7. The access network device according to claim 4, wherein the paging signal includes a paging indication and a paging message; each of the sub-bands includes m synchronization signal blocks located in m consecutive time domain units, and a synchronization signal is carried by the synchronization signal blocks, the m being a positive integer greater than 1; and
the paging indication is carried by a time-frequency resource that is located after the time domain position of the synchronization signal in each of the synchronization signal blocks, and the paging message is carried by m time-frequency resources that are located after the time domain position of the m synchronization signal blocks.

8. The access network device according to claim 4, wherein the processor is further configured to:
transmit system information to the terminal,
wherein the system information carries a paging occasion (PO) that corresponds to the paging signal, and the PO is determined by a length of the time-frequency resource, occupied by the paging signal, in a time domain.

9. The access network device according to claim 4, wherein the processor is further configured to:
configure the paging signal corresponding to a first terminal and/or a second terminal to be carried by the first time-frequency resource; and
configure the paging signal corresponding to a second terminal to be carried by the second time-frequency resource;
wherein the first terminal is a terminal that does not support a preset frequency band; the second terminal is a terminal that supports the preset frequency band; and a frequency band of the second time-frequency resource belongs to the preset frequency band.

10. The access network device according to claim 9, wherein the paging signal includes a paging indication and a paging message;
the paging indication and the paging message of the first terminal and the paging indication of the second terminal are carried by the first time-frequency resource, and the paging message of the second terminal is carried by the second time-frequency resource;
or
the paging indication and the paging message of the first terminal are carried by the first time-frequency resource, and the paging indication and the paging message of the second terminal are carried by the second time-frequency resource.

11. The access network device according to claim 9, wherein the processor is further configured to:
transmit a resource position of the first time-frequency resource to the first terminal and the second terminal via minimum system information (minimum SI); and
transmit a resource position of the second time-frequency resource to the second terminal via other system information (other SI).

12. A terminal comprising:
a processor;
a transceiver connected to the processor; and
a memory for storing a processor-executable instruction, wherein the processor is configured to:
receive a paging signal transmitted by an access network device, wherein the paging signal is transmitted by the access network device simultaneously using n scanning beams on n sub-bands, and then scanning beams that correspond to the n sub-bands, respectively, have different beam scanning areas, n being a positive integer greater than 1, and a collection of the beam scanning areas of the n scanning beams is a coverage of a cell of the access network device.

13. The terminal according to claim 12, wherein the n is determined by a number of transmission reception points (TRPs); and/or the n is determined by a number of terminals located in the coverage of the cell of the access network device.

14. The terminal according to claim 12, wherein
the paging signal occupies a first time-frequency resource on the sub-bands;
or
the paging signal occupies the first time-frequency resource and a second time-frequency resource on the sub-bands.

15. The terminal according to claim 14, wherein receiving the paging signal transmitted by the access network device comprises:
receiving, by the terminal, the paging signal on the first time-frequency resource when the terminal is a first terminal; and
receiving, by the terminal, the paging signal in the first time-frequency resource and/or the second time-frequency resource when the terminal is a second terminal;
wherein the first terminal is a terminal that does not support a preset frequency band; the second terminal is a terminal that supports the preset frequency band; and a frequency band of the second time-frequency resource belongs to the preset frequency band.

16. The terminal according to claim 15, wherein the paging signal comprises a paging indication and a paging message;
the paging indication and the paging message of the first terminal and the paging indication of the second terminal are carried by the first time-frequency resource, and the paging message of the second terminal is carried by the second time-frequency resource;
or
the paging indication and the paging message of the first terminal are carried by the first time-frequency resource, and the paging indication and the paging message of the second terminal are carried by the second time-frequency resource.

17. The terminal according to claim 15, wherein the processor is further configured to:
receive a resource position of the first time-frequency resource that is transmitted by the access network device via minimum system information (minimum SI), when the terminal is the first terminal; and receive the resource position of the first time-frequency resource that is transmitted by the access network device via the minimum SI and a resource position of the second time-frequency resource that is transmitted by the access network device via other system information (other SI), when the terminal is the second terminal.

18. The terminal according to claim 14, wherein each of the sub-bands comprises m synchronization signal blocks located in m consecutive time domain units, and a synchronization signal is carried by the synchronization signal blocks, the m being a positive integer greater than 1;

the paging signal is carried by a time-frequency resource that is located after a time domain position of the synchronization signal in each of the synchronization signal blocks;

or the paging signal is carried by each of the synchronization signal blocks, the paging signal having the same time domain position as the synchronization signal;

or the paging signal is carried by m time-frequency resources that are located after the time domain position of the m synchronization signal blocks; wherein a frequency band of the first time-frequency resource belongs to the frequency band of the synchronization signal blocks, and the frequency band of the second time-frequency resource does not belong to the frequency band of the synchronization signal blocks.

* * * * *